Jan. 21, 1964    D. B. KREIDER    3,118,480
CLIP NUT
Filed June 15, 1961
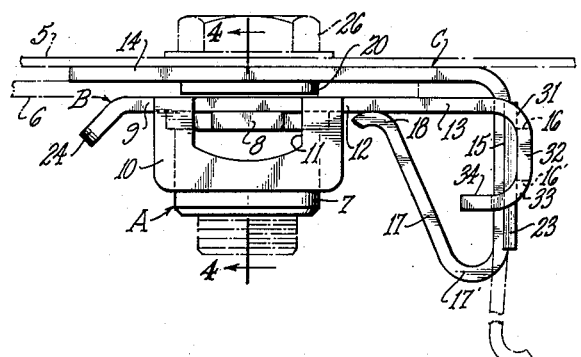
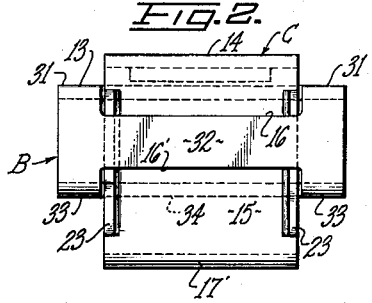
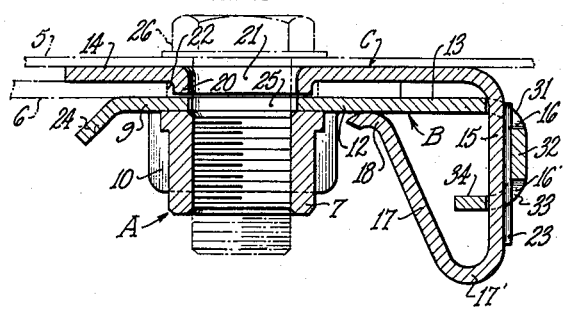
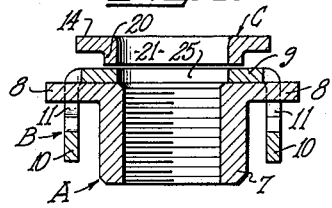
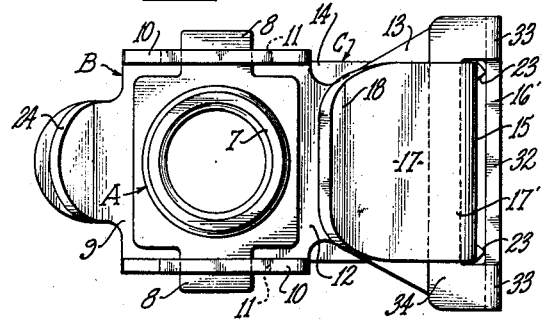
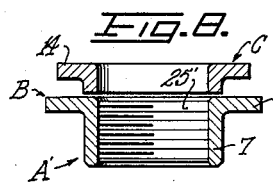
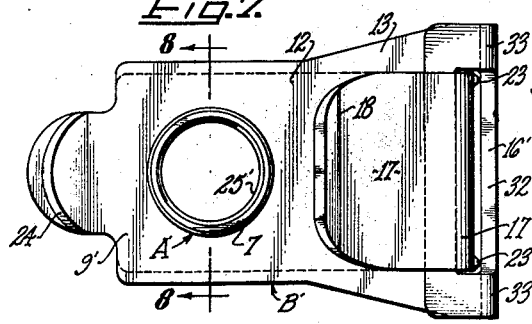
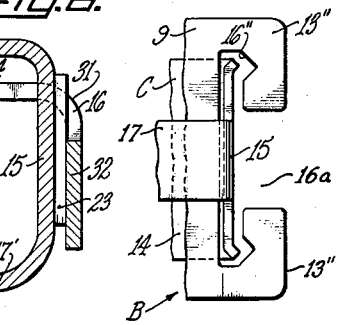
INVENTOR.
DAVID B. KREIDER
BY
Lynn H. Latta
ATTORNEY United States Patent Office
3,118,480
Patented Jan. 21, 1964

3,118,480
CLIP NUT
David B. Kreider, Santa Ana, Calif., assignor to
Frederick W. Rohe, Anaheim, Calif.
Filed June 15, 1961, Ser. No. 117,385
17 Claims. (Cl. 151—41.75)

This application is a continuation in part of my pending applications S.N. 799,316, filed March 13, 1958 for Clip Nut and S.N. 69,034, filed November 14, 1960, for Clip Nut, both now abandoned.

This invention relates to an assembly of nut and clip for holding the same to a work sheet, such assembly being commonly referred to as a "clip nut." The general object of the invention is to provide an improved clip nut assembly of greater versatility and wider application than the conventional clip nut.

Specifically, the invention provides, in a clip nut, a clip-on type of holder comprising separate jaws linked to one another at one end of the holder and spring loaded toward one another in such a manner as to accomplish self alignment of the jaws in substantially full contact with opposite faces of a metal sheet or plate to which the holder is clipped.

The invention provides a clip nut assembly that in many instances is adapted to replace a nut plate or a clinch nut, as well as any more conventional type of clip nut.

A specific object is to provide a clip nut assembly adaptable to a wide range of panel thicknesses, as contrasted to the rather narrow range of panel thicknesses to which the conventional clip nut is restricted because of an inherent angularity problem involved in opening the jaws thereof. More specifically, the invention aims to provide a clip nut assembly wherein the nut will remain centered at all times on the same axis with respect to the clip base, and always perpendicular to the base, regardless of the size of panel on which it is installed.

A further object is to provide a clip nut assembly characterized by greater ease of installation than in the case of the conventional clip nut.

A further object is to provide a clip nut assembly comprising separate jaws having connecting means of improved bracing characteristics linking the jaws together for relative bodily separating movements while maintaining parallel relationship to one another. More specifically, the invention contemplates a linking arrangement between slidably separable jaws, tending to positively maintain the parallel relationship between the jaws.

Other objects and advantages will become apparent in the ensuing specification and appended drawing in which:

FIG. 1 is a side view of a clip nut assembly embodying my invention;
FIG. 2 is an end view of the same;
FIG. 3 is a longitudinal sectional view thereof;
FIG. 4 is a transverse sectional view taken on the line 4—4 of FIG. 1;
FIG. 5 is a plan view of the clip nut of FIG. 1;
FIG. 6 is a fragmentary sectional view showing a modified form of the invention;
FIG. 7 is a plan view of a clip nut embodying a modified form of the invention;
FIG. 8 is a sectional view thereof, taken on line 8—8 of FIG. 7; and
FIG. 9 is a fragmentary plan view showing another modified form of the invention.

*Detailed Description—Preferred Form of Invention—FIGS. 1–5*

Referring now to the drawing in detail, I have shown in FIGS. 1–5 thereof, as an example of one form in which the invention may be embodied, a clip nut assembly comprising, in general, a nut A, a two-part holding clip comprising a base member B which holds the nut A, and a back member C which cooperates with the base member B to secure the assembly to work sheets which are shown in phantom at 5 and 6.

The nut A includes an internally threaded nut body 7 and a pair of tongues 8 extending in a common radial plane from one end of the nut body 7 in diametrically opposite directions.

The base member B, which is of stamped sheet metal or equivalent material, comprises a rectangular body portion 9 having a pair of wings 10 bent in a common direction from the respective side margins thereof and provided with narrow slots 11, flush with the surface of body portion 9 and adapted to receive therein the tongues 8, to loosely attach the nut to the base member B with freedom for self-aligning movement over an aperture 25 (FIG. 4) disposed centrally in the body portion 9, and through which a bolt 26 may be inserted to be coupled to the nut.

Rectangular body portion 9 of the base is joined by a waist portion 12 to a flaring tail 13 which in turn is joined by a pair of laterally spaced L-bend webs 31 to a transverse retainer bridge 32 disposed in a plane at right angles to the body 9 and tail 13. Bridge 32 is joined by a pair of laterally spaced return-bent L-webs 33 to a transverse terminal bar 34 disposed parallel to and in opposed relation to the outer end of tail 13. A transversely elongated aperture 16 is defined between the outer end of tail 13 and retainer bridge 32. A transversely elongated aperture 16′ is defined between the bridge 32 and the terminal bar 34. The respective ends of apertures 16 and 16′ are defined by the L-webs 31, 33. The apertures 16, 16′ are in registering relation to one another across the longitudinal axis of the assembly.

The back member C, which likewise is of stamped sheet metal construction or equivalent, comprises an elongated flat body portion 14 having one end thereof bent at right angles to define a guide arm 15 which extends through the registering apertures 16, 16′ and beyond the terminal bar 34, for coupling the members B and C loosely together in a proper registering relation. The arm 15 is continued with an integral return bent finger 17 having a tip portion 18 adapted to bear against the central area of waist portion 12 of the base member B. Finger 17 is joined to arm 15 by a U-bend 17′.

Formed in the center of the area of back member C which registers with the body portion 9 of member B, is a boss 20 defining a bolt aperture 21 (FIG. 3). Boss 20 is adapted to locate in an opening 22 punched or drilled in the work sheet 6, so as to anchor the clip assembly to the work sheet 6 with the bolt opening 21 coaxial with the nut 7, and to resist any dislodgement of the clip assembly from the work sheet 6. Preferably, the back member C is of spring sheet metal.

The bridge 32 functions as a retainer or abutment for engagement by arm 15 for longitudinal positioning of the jaws B and C with the bolt apertures 21 and 25 coaxial. Strength of the assembly is provided by the bearing of arm 15 against bridge 32. Strength in the coupling between parts B and C is further provided by the bridging integral connection between the arms of yoke 13, which is provided by the ample-width bridge 32. Also, the overall length of the assembly is reduced to a minimum (for an assembly having such strength) by virtue of the arrangement wherein arm 15 and bridge 32 are in face to face adjacency in planes transverse to the longitudinal axis of the assembly.

The side margins of arm 15 may be provided with reinforcing flanges 23 bent at an angle of approximately 135° as shown in FIG. 5, for stiffening the arm. These flanges 23 function not only to stiffen the arm 15, but also to prevent the same from burring and brinelling a work panel to which the clip nut is attached when the edge margin of its hole is less than maximum.

Remote from bridge 32, the base member B is provided with a tab 24 for assistance in manipulating the base member. The tab 24 may extend at approximately a 45° angle to the body member 9 as shown in FIG. 3.

The end of back member C adjacent tab 24 projects beyond the tab sufficiently to be readily engaged by a finger tip of one hand of a workman while tab 24 is grasped between the fingers of the other hand, to effect the spreading of the jaws B, C.

At this point, it may be noted that the base member B and back member C, in their assembled parallel relation shown in FIG. 3, function as a pair of opposed jaws which are spring-loaded toward one another to yieldingly grip between them the work sheet 6 when the clip nut is preliminarily installed thereon. Accordingly, the parts B and C will be collectively referred to as jaws.

The reinforcing flanges 23 are adapted to bear against the inner face of bridge 32 while the inner face of arm 15 substantially engages the edges of tail 13 and terminal bar 34 defining the inward extremities of apertures 16, 16'. The terminal bar 34 will engage the inner face of arm 15 to limit the possible angular spreading movement between the jaws 9 and 14, thus tending to maintain the jaws in substantially parallel relation, while permitting bodily separation of the jaws by relative sliding movements between arm 15 and the parts 13, 32 and 34.

*Assembly.*—The clip members B and C are assembled (e.g. at the factory) before applying them to the work. In the fabrication of the device, the jaw C is initially formed, as shown in FIG. 1, with the finger 17 projecting from arm 15 in a position at right angles to the jaw C as indicated in broken lines in FIG. 1. In this position, the finger 17 is threaded throught the registering apertures 16' to the position shown in broken lines in FIG. 1. As thus assembled, the jaws B and C are placed in a suitable bending die and the finger 17 of jaw B is bent toward the body portion 14 thereof, forming the U-bend 17', which is stressed past its final shape sufficiently so that, upon spring-back, finger 17 will assume a normal position closed in toward arm 15 somewhat more closely than its position shown in FIG. 3. Thus, in the FIG. 3 position it will be flexed sufficiently to exert at least a light spring loading between the jaws B and C when applied to a work sheet 6 in embracing relation thereto.

This forming operation is performed while the jaw B is in an annealed condition. Subsequent to the assembly and forming operations, the assembled clip is heat treated for hardening to impart adequate spring-loading characteristics. To this end, the parts are fabricated from a material having suitable hardening characteristics.

*Installation.*—Subsequently, when it is desired to assemble the clip nut to the work (e.g. a pair of panel members 6 and 5 as shown in FIG. 3) the base member B is engaged by the tab 24 and moved away from the back member C, the other end of the base member B fulcruming against the other end of back member C, and the work panel 6 is inserted between the jaws B, C as thus spread apart until its aperture is aligned with the aperture 21 in collar 20 and with the aperture 25 in base member B. A second work panel 5 may then be applied against the back member C with its bolt aperture registering with the other apertures, and a bolt 26 may then be inserted through the registering apertures and engaged with the nut A. Initially, the base member B may be sprung away from the work sheet 6 to a tilted position so as to allow the head of bolt 26 to bear against the work sheet 5 while its tip is just entering the nut A. As the bolt is rotated to thread it into the nut A the nut and base member B will move back toward the work panel 6 until the base member B is seated snugly thereagainst in a manner similar to that shown in FIG. 1. It may be noted that at this point the slots 11 are of sufficient depth to accommodate the spreading of jaws B, C to flaring positions while inserting work sheet 6, and the consequent tilting of tongues 8 in slots 11 so that nut A can retain a position parallel to the jaw C at all times, including such spreading movement. The end of back member C adjacent tab 24 is preferably located at the proper distance from the side margin of work sheet 6 so that the engagement of boss 20 therein, in cooperation with the engagement of arm 15 in slot 16, will cooperatively retain the clip assembly in properly registering relation of jaws B and C thereof.

It will now be apparent that the invention provides a slidable connection between arm 15 of base member B and the tail yoke 13 of back member C which accommodates opening of the clip by bodily spreading movement of the members B and C relative to one another while maintaining generally parallel relationship, such opening movement being yieldingly resisted by the spring finger 17, the finger flexing at bend 17' so as to assume a more open position with reference to the waist section 12 of base member B as the members B and C are spread farther apart, and the finger tip 18 sliding toward the nut A to accommodate such increasingly acute position of finger 17. Thus any thickness of sheet or plate material may be embraced between the members B and C within quite a substantial range of thicknesses from the thinnest sheet to which a clip nut is applicable, up to a thickness of as much as ⅜" or even more, without varying the parallel relationship of the clip members B, C, nor the approximate axial alignment of nut A with apertures 21 and 25. Conversely, in the installation of the clip in embracing relationship to the marginal portion o fa sheet, the yielding spring pressure of finger 17 will adjust the clip members B and C toward one another into snug face to face engagement with the opposite surfaces of the work sheet 6, while the engagement of boss 20 in the aperture 22 will establish and maintain the proper position of bolt aperture 21 with relation to the work sheet 6.

Clearances between the tongues 8 and slots 11 on the one hand, and between the arm 15 and the edge of the aperture 16 on the other hand, are provided so as to give a satisfactory amount of self-aligning tolerance in the position of the threaded bore of nut body 7 with respect to the bolt aperture 21, although it will be understood that these clearances are sufficiently limited so that the confining engagement of arm 15 by tail yoke 13 of the base member B is such as to maintain substantially a predetermined registration between the apertures 21 and 25, with a small range of positions which can be assumed by the parts B and C for self-aligning tolerance, and that the nut A likewise will be retained in approximately a position of alignment with base aperture 25 so that only a small proportional adjustment will be required in fitting the bolt into the nut.

The engagement of arm 15 in aperture 16 in itself establishes the approximate registration of jaws B and C along the longitudinal axis of the assembly. Approximate lateral registration of the respective clip members is provided for primarily by the engagement of the side flanges 23 of arm 15 between the ends of aperture 16 (which in cooperation with tip 18 prevents excessive rotational displacement of the clip members B and C relative to one another about an axis normal to their body portions 9, 12 and 14 respectively).

*Modified Form—FIG. 6*

The showing in FIG. 6 illustrates, as a modification of the invention, a structure wherein the back member C terminates in the transverse retainer bridge 32. The slot 16' and terminal bar 34 are omitted. In other respects the clip nut of FIG. 6 may be the same as the one shown in FIGS. 1–5, or the one shown in FIG. 7. The addition of the terminal bar 34 of FIGS. 1–4 constitutes an improvement over the structure of FIG. 6, in providing for the bracing of the jaw members B and C in a manner to limit the degree of angular spreading movement of these jaw members, and in maintaining them substantially parallel as they are spread apart with a relative sliding action between the connecting parts 15, 31–34.

Modified Form—FIG. 9

In the structure of FIG. 9 there is shown a specific form of the broad invention, differing from the form shown in FIG. 6 in that, in lieu of the closed transverse aperture 16, an aperture in the form of a T-slot is defined between laterally opposed retainer claws 13" projecting toward one another in a plane of the flat body portion 14 of back member C, such claws having the broad retainer function of bridge 32 but being separated by a gap instead of extending uninterruptedly across the width of tail member 13, as does the bridge 32. Between opposed ends of claws 13" there is defined a gap 16a which is wider than the finger 17 to permit the insertion of the latter therethrough. The gap 16a constitutes a portion of a T-slot aperture which includes a pair of laterally projecting notches 16" which receive and confine the respective side marginal portions of arm 15 so as to retain the jaws B, C in assembly.

Except for the modified parts shown in FIG. 9, this clip nut assembly is the same as that shown in FIGS. 1–5 or, alternatively, the remainder of the assembly may be the same as that shown in FIGS. 7 and 8.

The jaws B and C of FIG. 9 may be assembled in a manner similar to that described for the assembly of the clip of FIGS. 1–5

The application of the clip assembly to the work is the same as that described in connection with FIG. 1–5.

Modified Form of Invention—FIGS. 7 and 8

In lieu of the coupling means 8, 10, 11 for retaining nut A, other loose coupling means of known construction in the plate nut art, modified to utilize the novel flaring slots 11 of this invention, can be substituted. For some applications, where reduction of cost to a minimum is a major factor, the invention may be embodied in the simplified form shown in FIGS. 7 and 8, wherein the nut, instead of being a separate part, with a self-aligning loose coupling connection to jaw B', is formed as an integral part of the jaw. Thus, in FIGS. 7 and 8, the nut A' consists in simply an integral collar drawn from the web of the body portion 9' around bolt aperture 25' therein. Except for these differences, jaw B' (and jaw C) are the same as the jaws of FIGS. 1–5, and corresponding parts are indicated by corresponding reference numerals.

I claim:

1. In a clip nut assembly: a two-part clip comprising a pair of jaws of generally flat plate form, normally parallel to one another, one of said jaws having a bolt aperture adjacent one end of the assembly, the other jaw having a nut in substantially coaxial relation to said aperture; one of said jaws having, at the other end of the assembly, a tail portion of closed-loop form defining an opening in the plane of the body of said one jaw, said tail portion including a transversely arranged right-dihedral angle bend embodying laterally spaced webs, and a bridge integrally connecting said webs and disposed in a transverse plane normal to the plane of the last-mentioned jaw, and the other jaw having an arm extending through said opening, disposed in a plane adjacent and parallel to said bridge and bearing against the side thereof which faces toward said nut and bolt aperture, said arm being integrally joined to said other jaw by a right dihedral angle bend, said arm having its lateral margins confined in the lateral extremities of said opening and engaged between said webs to provide a freely slidable coupling connection between said jaws such as to accommodate bodily spreading movement between said jaws in a direction parallel to the axis of said bolt aperture and nut for receiving between said jaws, work sheets of various thicknesses; and a resilient finger return-bent from the end of said arm remote from said jaws toward said one jaw and yieldingly engaging the latter to spring-load said jaws toward one another for self-aligning engagement thereof against opposite faces of a work sheet to effect temporary attachment of the assembly to said work sheet pending insertion of a bolt.

2. A clip nut assembly as defined in claim 1, wherein said nut is an integral up-struck collar on its respective jaw.

3. A clip nut assembly as defined in claim 1, wherein said nut is a separate part, and including means providing a self-aligning mounting of said nut on its jaw.

4. A clip nut assembly as defined in claim 1, wherein said opening is in the form of a transversely extending slot the ends of which are defined by said webs of said tail portion.

5. A clip nut assembly as defined in claim 1, wherein said bridge constitutes the terminal portion of said one jaw.

6. In a nut clip assembly: a back clip member and a separate nut retaining base clip member, both of elongated form having at one end of the assembly respective connecting parts providing a freely slidable connection between said members in a direction normal to the planes of said members for retaining them in assembled and roughly registering relationship prior to attachment to a work sheet and accommodating spreading movement between said members to receive between them work sheets of varying thickness; and an integral flexible spring finger on one of said clip members engaged with the other clip member to spring-load said clip members toward one another; said members having at the other end of said assembly respective bolt receiving apertures, and said base member having means for retaining a nut in approximate registration with its bolt receiving aperture, one of said clip members having, as its respective connecting part, a tail portion including a pair of flat claws disposed substantially in a common plane with the body of said one clip member and a T-slot one side of which is defined by said claws; and the other of said clip members including a body portion for engagement against a face of the work sheet and, at said one end of the assembly, an arm integral with and bent at right angles to said body portion and receivable in said T-slot, said claws being positioned to confine said arm in said T-slot thus providing said slidable connection between said clip member.

7. A nut clip assembly as defined in claim 6, wherein said spring finger is formed as a return-bent continuation of the end of said arm remote from said body portion and having a tip engageable with said one clip member for spring-loading said clip members toward one another, thereby retaining said clip members in engagement with an interposed work sheet.

8. A nut clip assembly as defined in claim 7, wherein said one clip member is formed with a pair of laterally spaced parallel beads extending longitudinally between said tail portion and the nut retaining means of said one clip member, and between which said spring finger tip is engageable for locating and maintaining approximate lateral registration between said clip members.

9. A nut clip assembly as defined in claim 8, wherein said arm and finger are formed as parts of said back member and said tail and T-slot are formed in said base member.

10. In a nut clip assembly; a two-part clip comprising a back member and a separate nut retaining base member, both of elongated form, generally flat, normally disposed in substantially parallel planes and adapted to embrace between them work sheets of varying thickness, said clip members having, at one end of the assembly, substantially registering bolt apertures; a nut carried by said base member at said one end of the assembly, said base member having at its other end a transverse aperture and including lateral webs projecting from a transverse end margin thereof, and retainer means integral with said webs, extending transversely in spaced relation to said end margin, and cooperating with said webs and end margin to define said transverse aperture; said back member having, at said other end of the assembly, an arm integral therewith and bent at right angles and projecting through said transverse aperture to provide a freely slidable connection between said members for retaining them against relative longitudinal displacement; and a flexible, resilient finger formed as a return-bent continuation of the end of the said arm remote from said back member and having a free tip yieldingly bearing against said base member at a point between said arm and said nut and adjacent the latter, for spring-loading said members into self-aligning, full contact engagement with the respective faces of an interposed work sheet.

11. A nut clip assembly as defined in claim 10, wherein said base member and nut are provided with interengaging means coupling said nut loosely to said base member for self-aligning adjustment with respect to the bolt aperture of said base member.

12. A nut clip assembly as defined in claim 10, wherein said resilient finger extends diagonally from said remote end of said arm to said nut base member, and is in free pressure contact with an intermediate area thereof.

13. In a nut clip assembly: a pair of opposed separate jaws of generally flat plate form, normally parallel to one another, said jaws, adjacent one end of the assembly, having respectively a bolt aperture and a nut in substantially coaxial relation; said jaws, at the other end of the assembly, having respective coupling means, one of said coupling means being an arm and the other comprising a pair of laterally disposed webs projecting from a transverse end margin of the body of its respective jaw, and retainer means integral with said webs and extending transversely in spaced relation to said end margin an cooperating with said webs and end margin to define a transverse aperture through which said arm projects; and a resilient finger intgeral with and return-bent from the end of one of said coupling means remote from its respective jaw and having a tip yieldingly bearing against the other jaw for spring-loading said jaws toward one another, said coupling means providing for relative sliding movements between the coupled ends of the jaws, such that the jaws may assume parallel relation in all positions of separation, so as to establish spring-loaded full-contact engagement with opposite faces of work sheets of varying thickness.

14. In a nut clip assembly: a pair of opposed separate jaws of generally flat plate form, normally parallel to one another, said jaws, adjacent one end of the assembly, having respectively a bolt aperture and a nut in substantially coaxial relation; said assembly, at its other end, having a coupling comprising an arm integrally joined to the end of one jaw and projecting therefrom at right angles, and a pair of laterally-spaced integral webs projecting from the end of the other jaw substantially in a common plane therewith and defining between them an opening through which said arm extends, and integral means projecting from the ends of said webs behind said arm and confining the same in said opening; and a resilient finger integral with and return-bent from the end of said arm remote from said one jaw and having a tip yieldingly bearing against the other jaw for spring-loading said jaws toward one another, said coupling providing for relative sliding movements between the coupled ends of the jaws, such that the jaws may assume parallel relation in all position of separation, so as to establish spring-loaded full contact engagement with opposite faces of work sheets of varying thickness.

15. In a nut clip assembly: a pair of clip members, namely, a back member and a separate nut-retaining base member, both of stamped sheet material, said clip members including respective elongated body portions having at one end of the assembly respective bolt apertures and having at the other end of the assembly respective inter-engaging connecting parts that are freely slidable with respect to one another in a direction parallel to the axis of said apertures and which function to retain said clip members in assembly with approximate registration of said bolt apertures prior to application to a work sheet and to accommodate spreading movement of said members to receive between them work sheets of various thicknesses, said nut base member having a pair of laterally spaced wings provided with opposed slots adjoining the body portion of said base member and adapted to receive a pair of diametrically oppositely projecting tongues of a nut seated against said base member body portion and to provide a self-aligning approximate registration of said nut with said bolt aperture; said connecting parts comprising a tail portion on said base member of said other end of the assembly, said tail portion having a T-slot and a pair of opposed, laterally spaced claws defining the open side of said T-slot; said back member including at said other end of the assembly an integral arm defining a right dihedral angle with its body portion and received in the head of said T-slot to establish said slidable connection, and further including a spring finger formed as a return bent integral continuation of said arm, extending diagonally toward the body portion of said back member in the general direction of its bolt aperture and adapted to yieldingly engage the corresponding body portion of said base member to urge said clip members toward one another into snug embracing engagement with a work sheet embraced therebetween.

16. A nut clip assembly as defined in claim 15, wherein said base member includes a pair of laterally spaced parallel beads disposed between the bolt aperture and the T-slot of said back member and extending parellel to the longitudinal axis of said base member, between which the tip of said flexible finger is engageable to provide, in cooperation with the engagement of said arm in said T-slot, approximate lateral registration of said clip members with one another.

17. A nut clip assembly as defined in claim 16, and in combination therewith, a nut including a body portion having an internally threaded bore and a pair of integral retainer tongues projecting radially in opposite directions from one end of said body portion and receivable in said retainer slots of said base member for providing a loose, self-aligning connection between said nut and said base member with approximate registration between the nut bore and the bolt apertures of said clip members.

References Cited in the file of this patent
UNITED STATES PATENTS

| | | |
|---|---|---|
| 576,824 | Reynolds | Feb. 9, 1897 |
| 640,250 | Zimmlinghaus | Jan. 2, 1900 |
| 2,378,258 | Tinnerman | June 12, 1945 |
| 2,672,905 | Hartman et al. | Mar. 23, 1954 |
| 2,888,971 | Wooton | June 2, 1959 |

FOREIGN PATENTS

| | | |
|---|---|---|
| 1,236,404 | France | June 7, 1960 |